United States Patent
Harada

[11] 3,864,027
[45] Feb. 4, 1975

[54] TELEPHOTO LENS SYSTEM HAVING SMALL OVERALL LENGTH

[75] Inventor: Kenichi Harada, Tokyo, Japan

[73] Assignee: Olympus Optical Company Limited, Tokyo, Japan

[22] Filed: May 8, 1973

[21] Appl. No.: 358,366

[30] Foreign Application Priority Data
May 10, 1972  Japan.................................. 47-46086

[52] U.S. Cl.................................. 350/216, 350/222
[51] Int. Cl............................ G02b 9/60, G02b 9/36
[58] Field of Search............................ 350/216, 222

[56] References Cited
UNITED STATES PATENTS

| | | | |
|---|---|---|---|
| 2,730,017 | 1/1956 | Fronnier | 350/216 |
| 3,502,394 | 3/1970 | Kobayashi | 350/216 |
| 3,524,700 | 8/1970 | Eggert et al. | 350/216 |

Primary Examiner—Ronald L. Wibert
Assistant Examiner—Conrad Clark
Attorney, Agent, or Firm—Waters, Roditi, Schwartz & Nissen

[57] ABSTRACT

A telephoto lens system having a small overall length, a picture angle of 6°11' and an aperture ratio of F/6.3, which is constructed by three components and five lenses and comprises a front lens group and a rear lens group separated by a diaphragm space, said front lens group consisting of a biconvex first component that has its object side a convex surface having a large radius of curvature followed by a negative doublet composed of two negative lenses or followed by divided two negative lenses, said doublet or lenses constituting a second component that has its object side a concave surface having a large curvature, said rear lens group consisting of a doublet or divided two negative lenses and constituting a third component composed of a negative lens that has its object side a concave surface having a large radius of curvature followed by a positive lens that has its image side a convex surface having a large curvature, and which is defined by the following five conditions, i.e.

1) $(0.9/f) < (n_1 - 1/r_2) + (1 - n_2/r_3) < (1.3/f)$,
2) $-0.07 < (r_B/r_F) < 0.1$,
3) $0.01f < d_2 < 0.05f$,
4) $0.07 < f_1/f_3 < 0.35$, and
5) $0 < f_3 - f_2/f < 3$ where $d_2$ is an air space between the first and second components $r_1$ to $r_2$ are radii of curvature of the front and rear surfaces of the first component, $r_3$ is a radius of curvature of the front surface of the second component, $f$ is an overall focal length of the total lens system, $f_1$, $f_2$ and $f_3$ are focal lengths of the first, second and third lenses counted from the object side, respectively, $n_1$ and $n_2$ are refractive indexes of the first and second lenses, respectively, $r_F$ is that surface of the two lens surfaces bounding a diaphragm space which is located at the object side, and $r_B$ is that surface of the two lens surfaces bounding the diaphragm space which is located at the image side.

4 Claims, 24 Drawing Figures

FIG_1
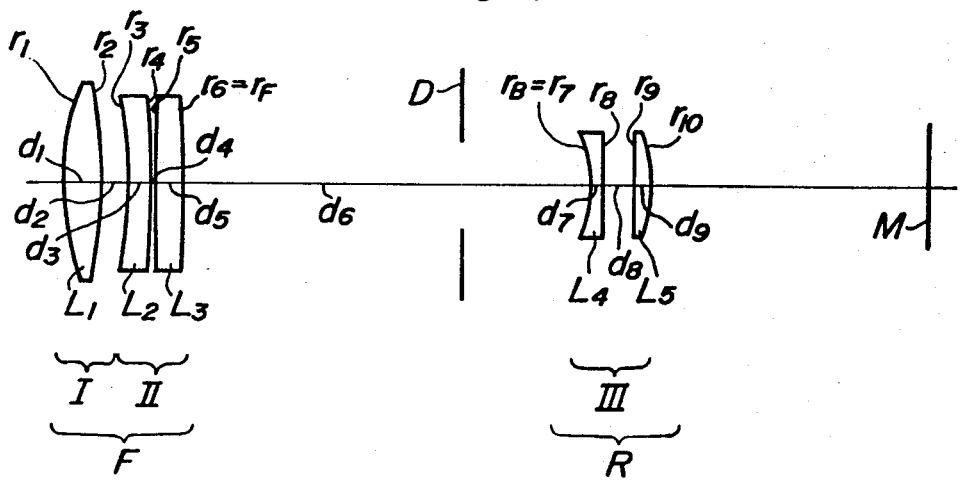
FIG_2
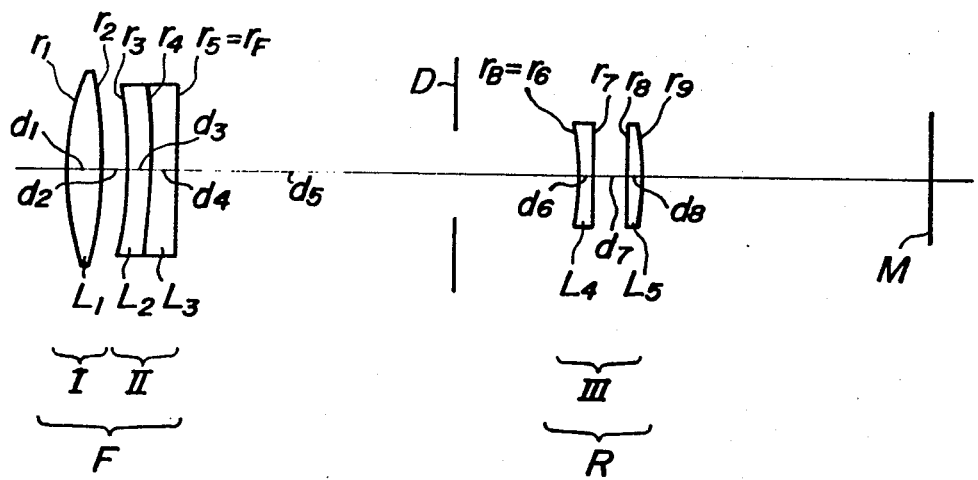

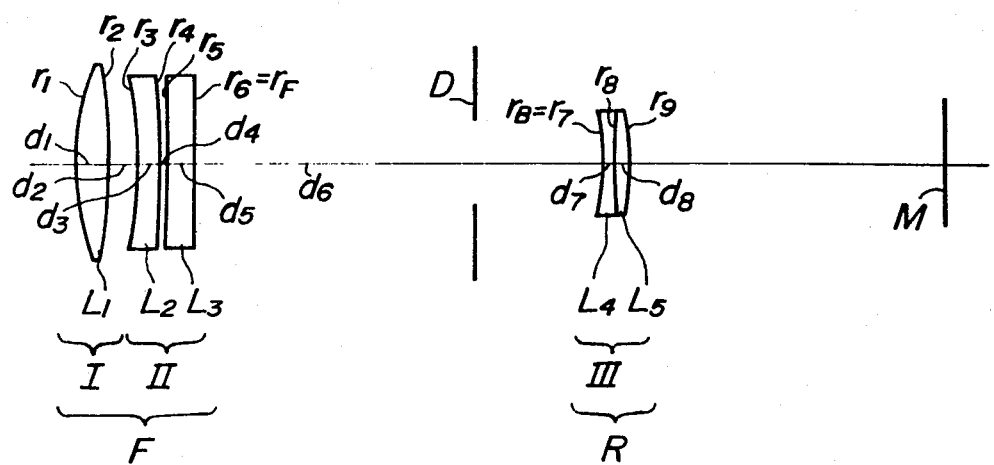
FIG_3

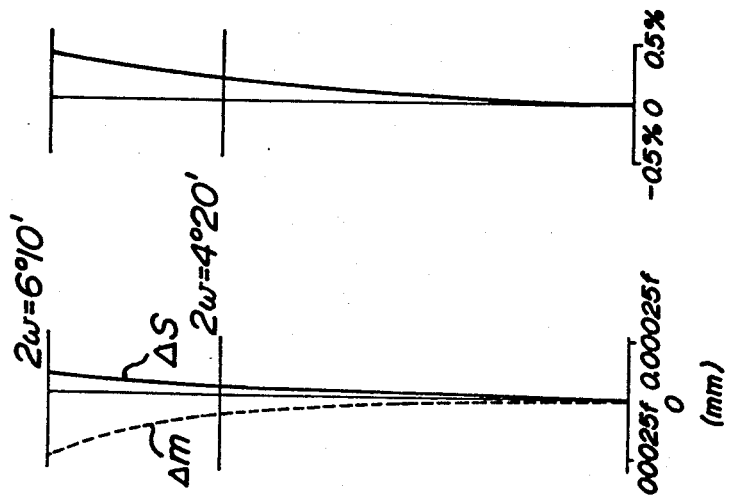
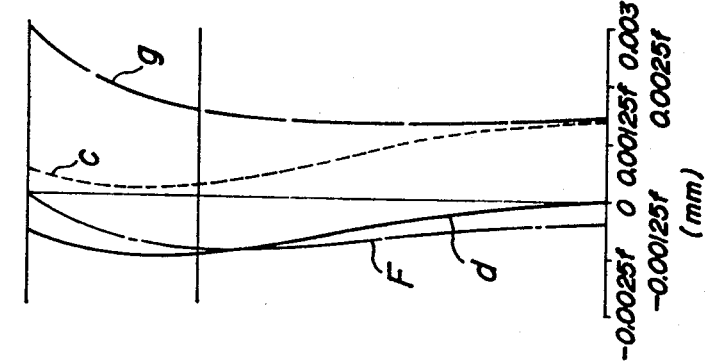
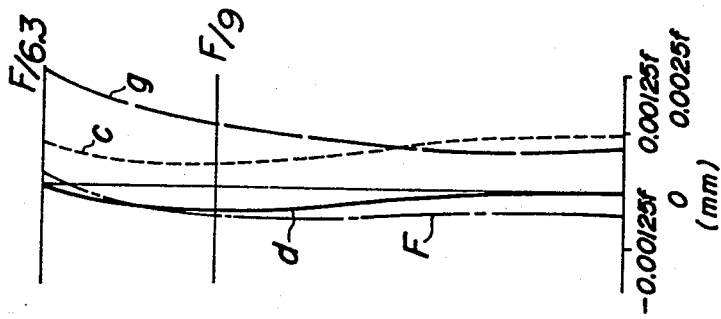

FIG_5a    FIG_5b    FIG_5c
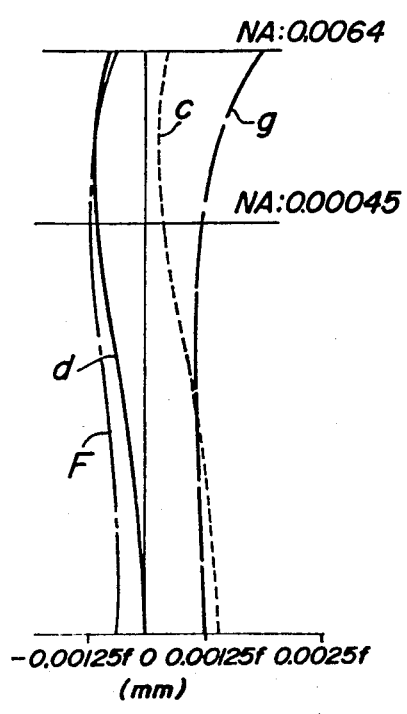
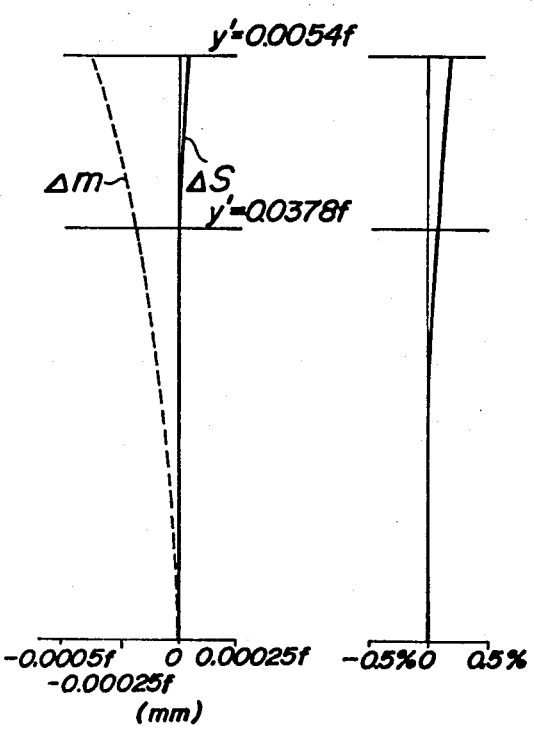

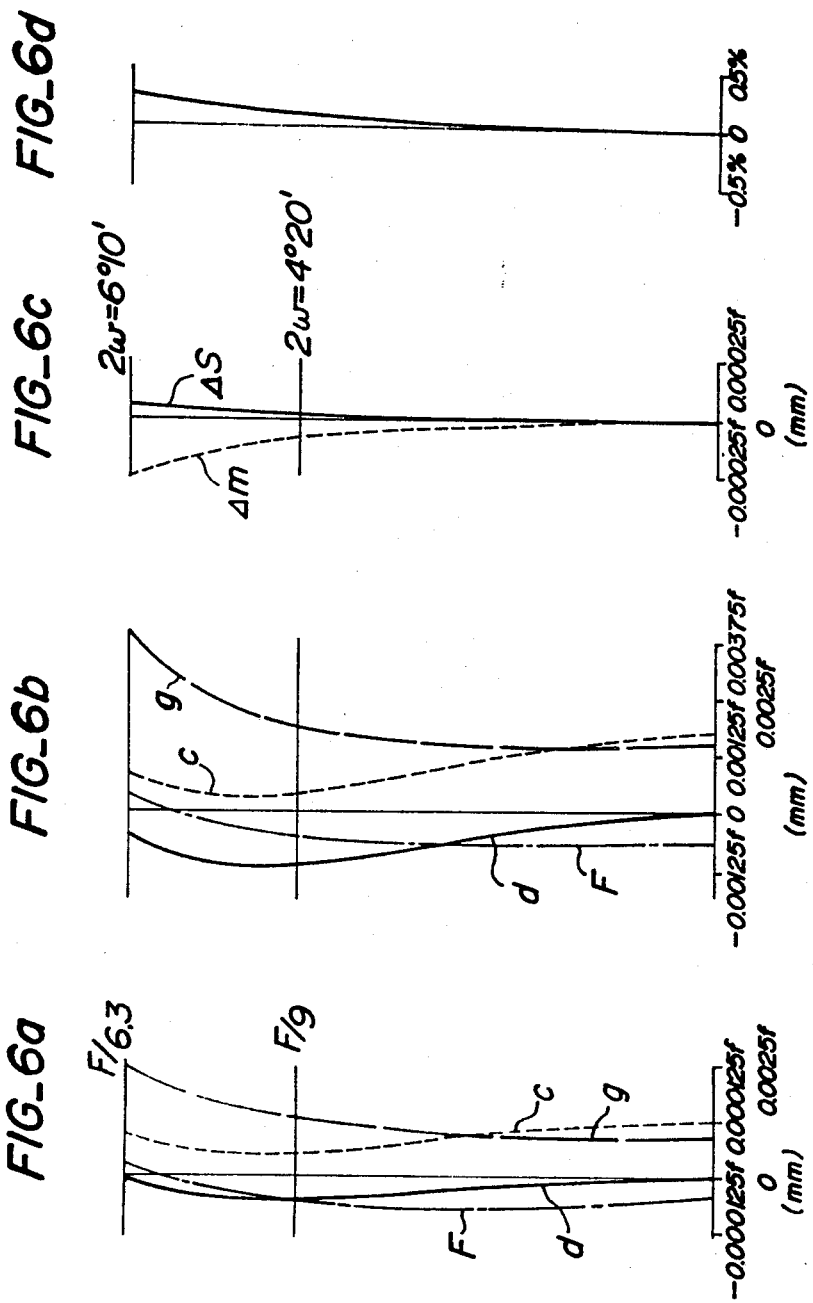

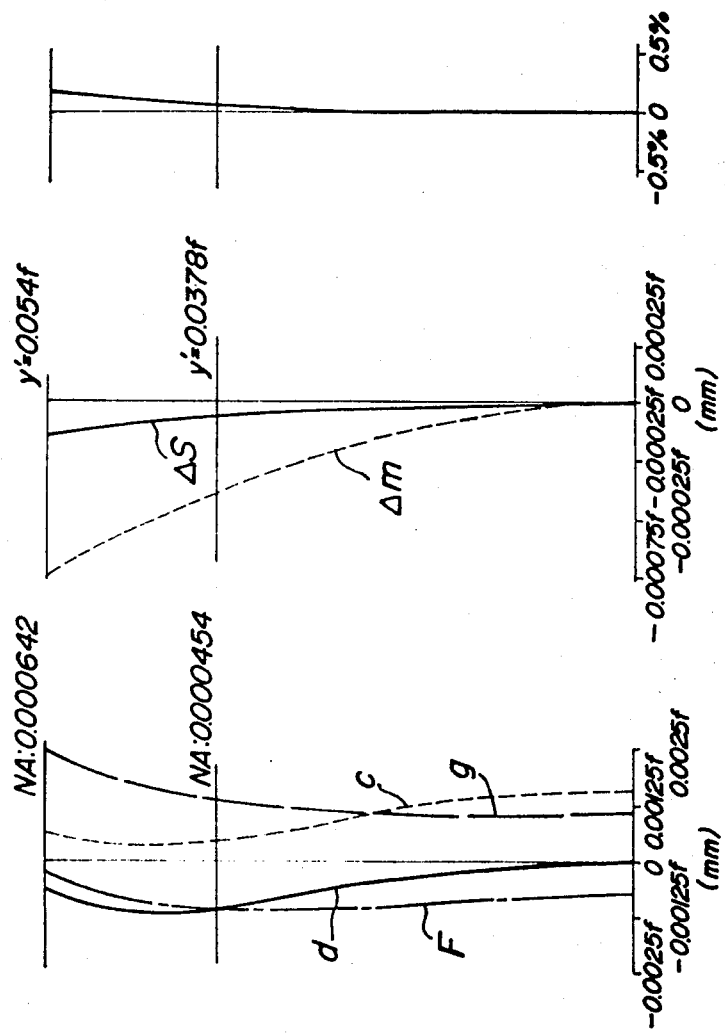

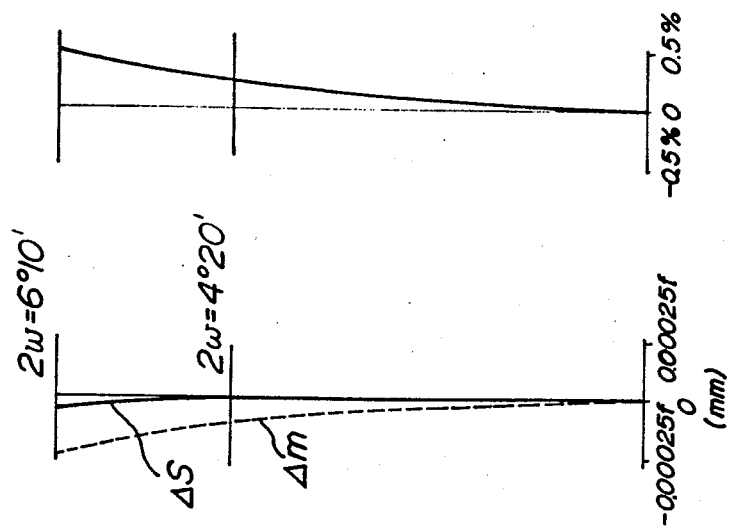
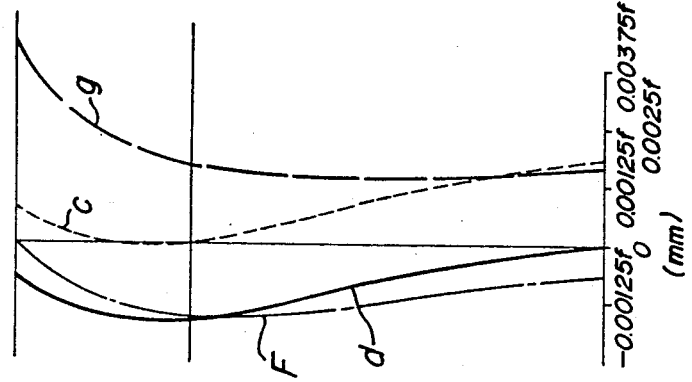
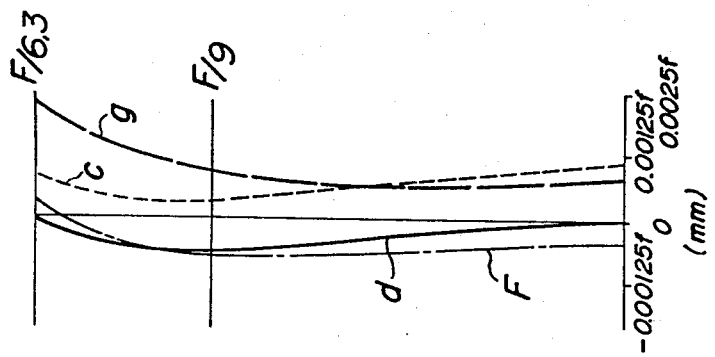
FIG.8a  FIG.8b  FIG.8c  FIG.8d

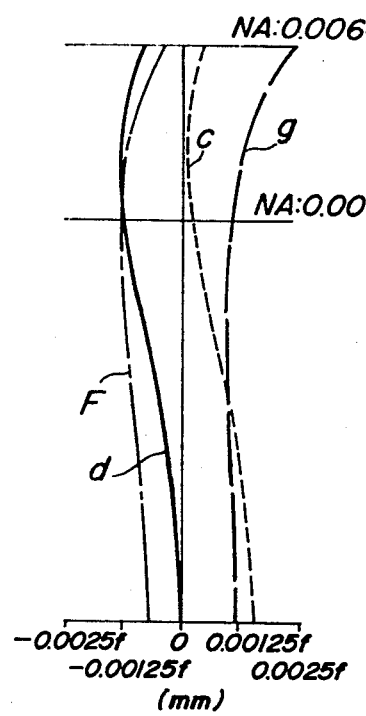
FIG_9a
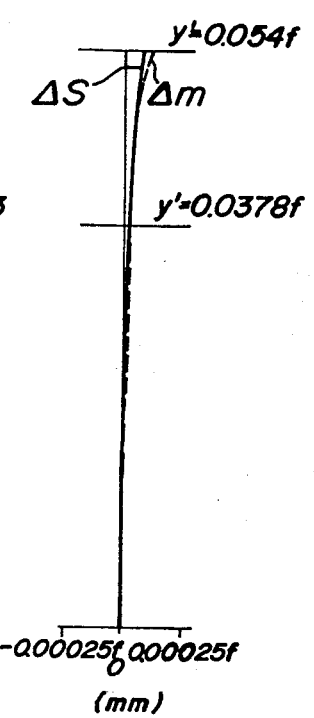
FIG_9b
FIG_9c

TELEPHOTO LENS SYSTEM HAVING SMALL OVERALL LENGTH

This invention relates to a telephoto lens system having a small overall length, a picture angle of 6°11' and an aperture ratio of F/6.3, and constructed by five lenses each made of common glass material.

The telephoto lens system is large in size and heavy in weight and hence is often troublesome in its handling. Thus, it is desirous to make the overall length of the lens system, that is, the distance from the front end thereof to the image surface as small as possible.

The telephoto ratio $t$ is defined by $$t = B/f$$

where $B$ is the distance from the front end of the lens system to the image surface and $f$ is a overall focal length of the lens system.

It has been well known that if the telephoto ratio $t$ is made small, the Petzval sum is negatively increased and at the same time the chromatic aberrations, particularly, the secondary spectrums are increased.

As means of obviating the above mentioned two disadvantages, a method has been proposed to make positive lenses of a front lens group located at the object side by a glass material having a low refractive index, and high dispersion and eventually with abnormal dispersion, and make negative lenses of the front lens group by a glass material having a high refractive index, and low dispersion and eventually with abnormal dispersion.

In accordance with such conventional method, it is preferable to use as the glass material $CaF_2$ or LaSF. These glass materials, however, are expensive and difficult in working operation. It has also been well known to use glass materials such as $CaF_2$, LaSF01, LaSF02, etc. in order to obtain a telephoto ratio $t$ from 0.65 to 0.76.

The common FK glass is less expensive and easily workable if compared with the above mentioned glass materials. The use of such glass materials, however, results in a difficulty in correction of the Petzval sum and chromatic aberrations, thereby making the telephoto ratio more than 0.8.

There is another problem of degrading the short distance photographic faculty, which is the problem encountered by photographic lenses in general. The photographic camera whose picture angle is on the order of 6° is frequently used with a magnification of 1/10 X. Thus, the degradation of the short distance photographic faculty is the most important problem. The short distance photographic faculty is degraded particularly when the meridional image surface curvature $\Delta m$ is considerably increased and hence the coma becomes unsymmetrical. As a result, it is particularly important to correct $\Delta m$ when the object is shortly distant away from the lens system. But, various aberrations produced when the object is infinitely distant away from the lens system must be corrected in the first place, so that the correction of $\Delta m$ when the object is shortly distant away from the lens system becomes extremely difficult.

The object of the invention, by adopting five positive, negative, negative, negative, positive lenses, using common FK5 glass for the positive lens of the front lens group and common LaF7, F16 glass for the negative lenses of front lens group and the conditions to be described later, is to provide a telephoto lens system having a telephoto ratio $t=0.75$ and designed to operate with a picture angle of 6°10', and an aperture ratio of F/6.3 and with substantial suppression of various aberrations when the object is infinitely distant away from the lens system as well as substantial suppression of various aberrations when the object is shortly distant away from the lens system and used with a magnification of 1/10 X.

A feature of the invention is the provision of a telephoto lens system having a small overall length, which is constructed by three components and five lenses and comprises a front lens group and a rear lens group separated by a diaphragm space, said front lens group consisting of a biconvex first component that has its object side a convex surface having a large curvature followed by a negative doublet composed of two negative lenses or followed by divided two negative lenses, said doublet or lenses constituting a second component that has its object side a concave surface having a large radius of curvature, said rear lens group consisting of a doublet or divided two negative lenses and constituting a third component, composed of a negative lens that has its object side a concave surface having a large radius of curvature followed by a positive lens that has its image side a convex surface having a large curvature, and which is defined by the following five conditions, i.e.

1) $(0.9/f) < (n_1-1/r_2) + (1-n_2/r_3) < (1.3/f)$,
2) $-0.07 < (r_B/r_F) < 0.1$,
3) $0.01f < d_2 < 0.05f$,
4) $0.07 < f_1/|f_3| < 0.35$, and
5) $0 < (|f_3| - |f_2|/f) < 3$ where $d_2$ is an air space between the first and second components, $r_1$ and $r_2$ are radii of curvature of the front and rear surfaces of the first component, $r_3$ is a radius of curvature of the front surface of the second component, $f$ is an overall focal length of the total lens system, $f_1$, $f_2$ and $f_3$ are focal lengths of the first, second and third lenses counted from the object side, respectively, $n_1$ and $n_2$ are refractive indexes of the first and second lenses, respectively, $r_F$ is that surface of the two lens surfaces bounding a diaphragm space which is located at the object side, and $r_B$ is that surface of the two lens surfaces bounding the diaphragm space which is located at the image side.

For a better understanding of the invention, the same will be explained by reference to the accompanying drawings, in which:

FIG. 1 shows in cross-section one embodiment of the telephoto lens system constructed according to the invention;

FIG. 2 shows in cross-section another embodiment of the telephoto lens system constructed according to the invention;

FIG. 3 shows in cross-section a further embodiment of the telephoto lens systems constructed according to the invention;

FIGS. 4a to 4d show aberration characteristic curves of the embodiment shown in FIG. 1 when the object is infinitely distant away from the lens system;

FIGS. 5a to 5c show similar aberration characteristic curves to those shown in FIGS. 4a to 4d, but when the object is shortly distant away from the lens system used with a magnification of 1/10 X;

FIGS. 6a to 6d show aberration characteristic curves of the embodiment shown in FIG. 2 when the object is infinitely distant away from the lens system;

FIGS. 7a to 7c show similar aberration characteristic curves to those shown in FIGS. 6a to 6d, but when the object is shortly distant away from the lens system used with a magnification of 1/10 X;

FIGS. 8a to 8d show aberration characteristic curves of the embodiment shown in FIG. 3 when the object is infinitely distant away from the lens system; and FIGS. 9a to 9c show similar aberration characteristic curves to those shown in FIGS. 8a to 8d, but when the object is shortly distant away from the lens system used with a magnification of 1/10 X.

Referring to FIG. 1 showing one embodiment of the invention which is constructed by three components I, II and III and five lenses $L_1$, $L_2$, $L_3$, $L_4$ and $L_5$, and comprises a front lens group F and a rear lens group R separated by a diaphragm space $d_6$. The front lens group F consists of a biconvex first component I that has its object side a convex surface $r_1$ having a large curvature followed by a second component II composed of two negative lenses $L_2$ and $L_3$. These lenses $L_2$ and $L_3$ are slightly spaced apart one from the other to form a negative lens as a whole. The rear lens group R consists of a third component III composed of a negative lens $L_4$ that has its object side a concave surface $r_7$ having a large curvature followed by a positive lens $L_5$ that has its image side a convex surface $r_{10}$ having a large curvature. These lenses $L_4$ and $L_5$ are slightly spaced apart one from the other to form a negative lens as a whole.

In the present embodiment, the first lens $L_1$ may be made of FK5, the second lens $L_2$ may be made of LaF7, the third lens $L_3$ may be made of F16, the fourth lens $L_4$ may be made of LAK04, and the fifth lens $L_5$ may be made of F5. These glass materials are less expensive and can easily be worked.

In the embodiment shown in FIG. 2, the first component I is composed of a biconvex lens $L_1$ that has its object side a convex surface $r_1$ having a large curvature. The second component II is composed of a negative doublet formed by cementing together the two negative lenses $L_2$ and $L_3$ that have their object sides concave surfaces $r_3$ and $r_4$ whose curvature are large. The third component III separated by a diaphragm space $d_5$ is composed of a negative lens $L_4$ that has its object side a concave surface $r_6$ having a large curvature followed by a positive lens $L_5$ that has its image side a convex surface $r_9$ having a large curvature. These lenses $L_4$ and $L_5$ are slightly spaced apart one from the other to form a negative lens as a whole.

In the embodiment shown in FIG. 3, the first component I is composed of a biconvex lens $L_1$ that has its object side a convex surface $r_1$ having a large curvature. The second component II is composed of two negative lenses $L_2$ and $L_3$ those have their object sides concave surfaces $r_3$ and $r_5$ having large radii of curvature respectively. These lenses $L_2$ and $L_3$ are slightly spaced apart one from the other to form a negative lens as a whole. The third component III separated by a diaphragm space $d_6$ is composed of a positive doublet formed by cementing a negative lens $L_4$ that has its object side a concave surface $r_7$ having a large curvature with a positive lens $L_5$ that has its image side a convex surface $r_9$ having a large curvature.

The reasons why the telephoto lens system according to the invention must satisfy the above mentioned five conditions will now be described.

The condition (1) defines an air lens formed between the first and second lenses $L_1$ and $L_2$. The condition (1) is capable of correcting, in the first place, the chromatic aberrations, particularly the transverse chromatic aberrations. If the telephoto lens system comprising the first and second lenses $L_1$ and $L_2$ each made of FK glass or LaF glass and having a telephoto ratio of 0.75 does not satisfy the condition (1), the chromatic aberrations could not be corrected. The condition (1) can suppress the image surface curvature, particularly, the meridional image surface curvature $\Delta m$ to the least possible extent when the object is infinitely distant away from the lens system.

The condition (2) can correct the negatively increased Petzval sum and has its purpose of correcting the sagittal image surface curvature $\Delta s$ while suppressing the meridional image surface curvature $\Delta m$ with the aid of the condition (1). If the condition (2) is not satisfied, it becomes difficult to correct the Petzval sum by means of the first and second lenses $L_1$ and $L_2$ each made of FK glass or LaF glass and by means of the other lenses.

The condition (3) aims for the correction of the spherical aberrations. If $d_2$ exceeds the upper limit 0.05 $f$, the correction of the spherical aberrations becomes remarkably insufficient. If $d_2$ becomes less than the lower limit $0.01f$, the spherical aberration is excessively corrected to give the appearance of objectionable flaring light rays.

The conditions (4) and (5) can make the telephoto ratio small up to $t=0.75$ as well as suppress the various aberrations, particularly, the meridional image surface curvature $\Delta m$ to the least possible extent when the object is shortly distant away from the lens system.

Within the range satisfying the condition (4), if $f_1$ is made as short as possible, the refractive power of the first lens $L_1$ can be increased and if $|f_3|$ is made as long as possible to decrease the diverging power, the telephoto ratio can be made small and the meridional image surface curvature $\Delta m$ can be suppressed when the object is shortly distant away from the lens system.

The condition (1) for suppressing the meridional image surface curvature $\Delta m$ when the object is infinitely distant away from the lens system can also correct $\Delta m$ when the object is shortly distant away from the lens system. The change of the refractive power of the third lens $L_3$ is particularly sensitive to the movement of $\Delta m$ when the object is shortly distant away from the lens system. The condition (4) makes use of this property of the third lens $L_3$.

The refractive power of the first lens $L_1$ is increased by the condition (4), and as a result, the correction of the spherical aberrations becomes considerably insufficient. Thus, the condition (5) with $|f_3|>|f_2|$ is capable of increasing the diverging power of the second lens $L_2$ and hence significantly correcting the spherical aberrations.

The negative lenses $L_2$ and $L_3$ are of the same type, but the aberration correcting property of the negative lens $L_2$ is entirely different from that of the negative lens $L_3$. The spherical aberrations are corrected in the first place by simultaneously satisfying the conditions (3) and (5) for the negative lens $L_2$, while $\Delta m$ when the object is shortly distant away from the lens system is corrected in the first place by satisfying the condition (4) for the negative lens $L_3$. Thus, the negative lenses $L_2$ and $L_3$ are not formed by merely dividing one negative lens into two lenses.

The invention will now be described with reference to the following examples.

Example 1

The telephoto lens system of the present example is shown in FIG. 1.

Representative values for the parameters $r_1$ to $r_{10}$ of the lens system shown in FIG. 1 together with the axial thicknesses and air spaces $d_1$ to $d_9$, the refractive indexes $n_1$ to $n_5$ and the Abbe numbers $\nu_1$ to $\nu_5$ are listed in the following table 1.

Table 1

$f=1$, $2\omega=6°10'$, F/6.3

| Lens | Radii | Thicknesses and air spaces | n | ν |
|---|---|---|---|---|
| I {L₁{ | $r_1= 0.22205$ | $d_1=0.02996$ | $n_1=1.48749$ | $\nu_1=70.1$ |
|  | $r_2=-0.41049$ | $d_2=0.02693$ |  |  |
| F { L₂{ | $r_3=-0.31939$ | $d_3=0.01864$ | $n_2=1.7495$ | $\nu_2=35.2$ |
|  | $r_4=-1.09410$ | $d_4=0.00506$ |  |  |
| II { L₃{ | $r_5=-1.72402$ | $d_5=0.02122$ | $n_3=1.5927$ | $\nu_3=35.6$ |
|  | $r_6= \infty$ | $d_6=0.35601$ |  |  |
| R{III { L₄{ | $r_7=-0.12905$ | $d_7=0.00917$ | $n_4=1.6510$ | $\nu_4=56.2$ |
|  | $r_8= 5.90492$ | $d_8=0.02928$ |  |  |
| L₅{ | $r_9= 1.26755$ | $d_9=0.01305$ | $n_5=1.60342$ | $\nu_5=38.0$ |
|  | $r_{10}=-0.24132$ |  |  |  |

The telephoto lens system so defined has an aperture ratio of F/6.3, a picture angle of 6°10', a Petzval sum of −0.157 and a telephoto ratio of 0.75.

The values of the conditions (1) to (5) are as follows.
The value of the condition (1) = 1.1591
The value of the condition (2) = 0
The value of the condition (3) = 0.0269
The value of the condition (4) = 0.103
The value of the condition (5) = 2.301
where $f=1$, $f_1=0.3$, $f_2=-0.608$ and $f_3=-2.909$.

Various aberrations characteristic curves of the present embodiment when the object is infinitely distant away from the lens system are shown in FIGS. 4a to 4d. FIG. 4a shows the spherical aberrations, FIG. 4b the sine conditions, FIG. 4c the astigmatisms, and FIG. 4d the distortion.

Various aberration characteristic curves of the present embodiment when the object is shortly distant away from the lens system used with a magnification of 1/10 X are shown in FIGS. 5a to 5c. FIG. 5a shows the spherical aberrations, FIG. 5b the astigmatism and FIG. 5c the distortion.

As seen from FIGS. 4a to 4d and FIGS. 5a to 5d, the lens system according to the present embodiment makes it possible to significantly correct various aberrations when the object is infinitely distant away from the lens system as well as when the object is shortly distant away from the lens system used with a magnification of 1/10 X.

Example 2

The telephoto lens system of the present example is shown in FIG. 2.

Representative values for the parameters $r_1$ to $r_9$ of the lens system shown in FIG. 2 together with the axial thicknesses and air spaces $d_1$ to $d_8$, the refractive indexes $n_1$ to $n_5$ and the Abbe numbers $\nu_1$ to $\nu_5$ are listed in the following table 2.

Table 2

$f=1$, $2\omega=6°10'$, F/6.3

| Lens | Radii | Thicknesses and air spaces | n | ν |
|---|---|---|---|---|
| I {L₁{ | $r_1= 0.22020$ | $d_1=0.02995$ | $n_1=1.48749$ | $\nu_1=70.1$ |
|  | $r_2=-0.41179$ | $d_2=0.02554$ |  |  |
| F { | $r_3=-0.32508$ | $d_3=0.01860$ | $n_2=1.7495$ | $\nu_2=35.2$ |
| II { L₂{ | $r_4=-0.65890$ | $d_4=0.02125$ |  |  |
| L₃{ | $r_5=-8.15629$ | $d_5=0.35521$ | $n_3=1.5927$ | $\nu_3=35.6$ |
|  | $r_6=-0.13233$ | $d_6=0.00915$ |  |  |
| R{III { L₄{ | $r_7=-1.64349$ | $d_7=0.02922$ | $n_4=1.6516$ | $\nu_4=58.6$ |
|  | $r_8= 11.22627$ | $d_8=0.01302$ | $n_5=1.5927$ | $\nu_5=35.6$ |
| L₅{ | $r_9=-0.30758$ |  |  |  |

The telephoto lens system so defined has an aperture ratio of F/6.3, an image angle of 6°10', a Petzval sum of −0.131 and a telephoto ratio of 0.75.

The values of the conditions (1) to (5) are as follows.
The value of the condition (1) = 1.1218
The value of the condition (2) = 0.0162
The value of the condition (3) = 0.0255
The value of the condition (4) = 0.247
The value of the condition (5) = 0.334
where $f=1$, $f_1=0.299$, $f_2=-0.877$ and $f_3=-1.211$.

Various aberrations characteristic curves of the present embodiment when the object is infinitely distant away from the lens system are shown in FIGS. 6a to 6d. FIG. 6a shows the spherical aberrations, FIG. 6b the sine conditions, FIG. 6c the astigmatisms, and FIG. 6d the distortion.

Various aberrations characteristic curves of the present embodiment when the object is shortly distant away from the lens system used with a magnification of 1/10 X are shown in FIGS. 7a to 7c. FIG. 7a shows the spherical aberrations, FIG. 7b the astigmatisms and FIG. 7c the distortion.

As seen from FIGS. 6a to 6d and FIGS. 7a to 7c, the lens system according to the present embodiment makes it possible also to significantly correct various aberrations when the object is infinitely distant away from the lens system as well as when the object is shortly distant away from the lens system used with a magnification of 1/10 X.

Example 3

The telephoto lens system of the present example is shown in FIG. 3.

Representative values for the parameters $r_1$ to $r_9$ of the lens system shown in FIG. 3 together with the axial thicknesses and air spaces $d_1$ to $d_8$, the refractive indexes $n_1$ to $n_5$ and the Abbe numbers $v_1$ to $v_5$ are listed in the following table 3.

Table 3

$f=1$, $2\omega=6°10'$, F/6.3

| Lens | Radii | Thicknesses and air spaces | n | v |
|---|---|---|---|---|
| F I {L₁{ | $r_1= 0.22373$ | $d_1=0.03022$ | $n_1=1.48749$ | $v_1=70.1$ |
| | $r_2=-0.40612$ | $d_2=0.02608$ | | |
| II {L₂{ | $r_3=-0.31658$ | $d_3=0.01900$ | $n_2=1.7495$ | $v_2=35.2$ |
| | $r_4=-0.88263$ | $d_4=0.00544$ | | |
| L₃{ | $r_5=-1.64903$ | $d_5=0.02164$ | $n_3=1.5927$ | $v_3=35.6$ |
| | $r_6= 3.27585$ | $d_6=0.35573$ | | |
| R{III {L₄{ | $r_7=-0.13307$ | $d_7=0.00915$ | $n_4=1.6516$ | $v_4=58.6$ |
| L₅{ | $r_8= 1.13748$ | $d_8=0.01303$ | $n_5=1.6034$ | $v_5=38.0$ |
| | $r_9=-0.20273$ | | | |

The telephoto lens system so defined has an aperture ratio of F/6.3, an image angle of 60°10', a Petzval sum of −0.006 and a telephoto ratio of 0.75.

The values of the conditions (1) to (5) are as follows.
The value of the condition (1) = 1.1671
The value of the condition (2) = −0.0406
The value of the condition (3) = 0.0261
The value of the condition (4) = 0.169
The value of the condition (5) = 1.18
where $f=1$, $f_1=0.301$, $f_2=-0.668$ and $f_3=-1.848$.

Various aberration characteristic curves of the present embodiment when the object is infinitely distant away from the lens system are shown in FIGS. 8a to 8d. FIG. 8a shows the spherical aberrations, FIG. 8b the sine conditions, FIG. 8c the astigmatisms, and FIG. 8d the distortion.

Various aberration characteristic curves of the present embodiment when the object is shortly distant away from the lens system used with a magnification of 1/10 X are shown in FIGS. 9a to 9c. FIG. 9a shows the spherical aberrations, FIG. 9b the astigmatisms and FIG. 9c the distortion.

As seen from FIGS. 8a to 8d and FIGS. 9a to 9d, the lens system according to the present embodiment makes it possible also to significantly correct various aberrations when the object is infinitely distant away from the lens system as well as when the object is shortly distant away from the lens system used with a magnification of 1/10 X.

As explained hereinbefore, the telephoto lens system according to the invention has a number of advantages. In the first place, it is possible to make the telephoto ratio small such as $t=0.75$ whereby the lens system becomes very easy in handling. Secondly, FK glass and LaF glass which are less expensive and easy in working operation may be used to from each lens. Third, various aberrations of the lens system can significantly be corrected. Fourth, the aberrations for the short distance photographic purposes are not so much degraded. Finally, the meridional image surface curvature is suppressed to the least possible extent when the object is infinitely distant away from the lens system.

What is claimed is:

1. A telephoto lens system having a small overall length, which is constructed by three components and five lenses and comprises a front lens group and a rear lens group separated by a diaphragm space, said front lens group consisting of a biconvex first component that has its object side a convex surface having a large curvature and a negative second component that has its object side a concave surface having a large curvature and that consists of two negative lenses, said rear lens group consisting of a negative lens and a positive lens and constituting a third component composed of a negative lens that has its object side a concave surface having a large curvature followed by a positive lens that has its image side a convex surface having a large curvature, and which is defined by the following five conditions, i.e., 1) $(0.9/f) < (n_1-1/r_2) + (1-n_2/r_3) < (1.3/f)$,
2) $-0.07 < (r_B/r_F) < 0.1$,
3) $0.01f < d_2 < 0.05f$,
4) $0.07 < f_1/|f_3| < 0.35$, and
5) $0 < |f_3| - |f_2|/f < 3$ where $d_2$ is an air space between the first and second components $r_2$ to $r_3$ are radii of curvature of the front and rear surfaces of the first component, $r_3$ is a radius of curvature of the front surface of the second component, f is an overall focal lenth of the total lens systems, $f_1$, $f_2$ and $f_3$ are focal lengths of the first, second and third lenses counted from the object side, respectively, $n_1$ and $n_2$ are refractive indexes of the first and second lenses, respectively, $r_F$ is that surface of the two lens surfaces bounding a diaphragm space which is located at the object side, and $r_B$ is that surface of the two lens surfaces bounding the diaphragm space which is located at the image side.

2. A telephoto lens system having a small overall length as claimed in claim 1, wherein $f$ is 1 mm, the image angle $2\omega$ is 60°10' and the aperture ratio is F/6.3 and $r_1$ to $r_{10}$, $d_1$ to $d_9$, $n_1$ to $n_5$ and $\nu_1$ to $\nu_5$ are defined by the following values:

$f=1$, $2\omega=6°10'$, F/6.3

| Lens | | Radii | Thicknesses and air spaces | n | ν |
|---|---|---|---|---|---|
| I | L₁ | $r_1= 0.22205$ | | | |
| | | $r_2=-0.41049$ | $d_1=0.02996$ | $n_1=1.48749$ | $\nu_1=70.1$ |
| F | | $r_3=-0.31939$ | $d_2=0.02693$ | | |
| | L₂ | $r_4=-1.09410$ | $d_3=0.01864$ | $n_2=1.7495$ | $\nu_2=35.2$ |
| II | | $r_5=-1.74202$ | $d_4=0.00506$ | | |
| | L₃ | $r_6= \infty$ | $d_5=0.02122$ | $n_3=1.5927$ | $\nu_3=35.6$ |
| | | $r_7=-0.12905$ | $d_6=0.35601$ | | |
| | L₄ | $r_8= 5.90492$ | $d_7=0.00917$ | $n_4=1.6510$ | $\nu_4=56.2$ |
| R III | | $r_9= 1.26755$ | $d_8=0.02928$ | | |
| | L₅ | $r_{10}=-0.24132$ | $d_9=0.01305$ | $n_5=1.60342$ | $\nu_5=38.0$ |

3. A telephoto lens system having a small overall length as claimed in claim 1, wherein $f$ is 1 mm, the image angle $2\omega$ is 6°10' and the aperture ratio is F/6.3 and $r_1$ to $r_9$, $d_1$ to $d_8$, $n_1$ to $n_5$ and $\nu_1$ to $\nu_5$ are defined by the following values:

$f=1$, $2\omega=6°10'$, F/6.3

| Lens | | Radii | Thicknesses and air spaces | n | ν |
|---|---|---|---|---|---|
| I | L₁ | $r_1= 0.22020$ | | | |
| | | $r_2=-0.41179$ | $d_1=0.02995$ | $n_1=1.48749$ | $\nu_1=70.1$ |
| F | | $r_3=-0.32508$ | $d_2=0.02554$ | | |
| | L₂ | $r_4=-0.65890$ | $d_3=0.01860$ | $n_2=1.7495$ | $\nu_2=35.2$ |
| II | L₃ | $r_5=-8.15629$ | $d_4=0.02125$ | | |
| | | $r_6=-0.13233$ | $d_5=0.35521$ | $n_3=1.5927$ | $\nu_3=35.6$ |
| | L₄ | $r_7=-1.64349$ | $d_6=0.00915$ | | |
| R III | | $r_8= 1.22627$ | $d_7=0.02922$ | $n_4=1.6516$ | $\nu_4=58.6$ |
| | L₅ | $r_9=-0.30758$ | $d_8=0.01302$ | $n_5=1.5927$ | $\nu_5=35.6$ |

4. A telephoto lens system having a small overall length as claimed in claim 1, wherein $f$ is 1 mm, the image angle $2\omega$ is 6°10' and the aperture ratio is F/6.3 and $r_1$ to $r_9$, $d_1$ to $d_8$, $n_1$ to $n_5$ and $\nu_1$ to $\nu_5$ are defined by the following values:

$f=1$, $2\omega=6°10'$, F/6.3

| Lens | | Radii | Thicknesses and air spaces | n | ν |
|---|---|---|---|---|---|
| I | L₁ | $r_1= 0.22373$ | | | |
| | | $r_2=-0.40612$ | $d_1=0.03022$ | $n_1=1.48749$ | $\nu_1=70.1$ |
| F | | $r_3=-0.31658$ | $d_2=0.02608$ | | |
| | L₂ | $r_4=-0.88263$ | $d_3=0.01900$ | $n_2=1.7495$ | $\nu_2=35.2$ |
| II | | $r_5=-1.64903$ | $d_4=0.00544$ | | |
| | L₃ | $r_6= 3.27585$ | $d_5=0.02164$ | $n_3=1.5927$ | $\nu_3=35.6$ |
| | | $r_7=-0.13307$ | $d_6=0.35573$ | | |
| | L₄ | | $d_7=0.00915$ | $n_4=1.6516$ | $\nu_4=58.6$ |
| R III | | $r_8= 1.13748$ | | | |
| | L₅ | $r_9=-0.20273$ | $d_8=0.01303$ | $n_5=1.6034$ | $\nu_5=38.0$ |

* * * * *